United States Patent
Kim et al.

(10) Patent No.: US 9,880,940 B2
(45) Date of Patent: Jan. 30, 2018

(54) SYSTEM-ON-CHIP AND METHOD OF OPERATING THE SAME

(71) Applicant: SAMSUNG ELECTRONICS CO., LTD., Suwon-Si, Gyeonggi-Do (KR)

(72) Inventors: Kwan Ho Kim, Suwon-Si (KR); Seok Min Kim, Suwon-Si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 857 days.

(21) Appl. No.: 14/203,799

(22) Filed: Mar. 11, 2014

(65) Prior Publication Data

US 2014/0258674 A1  Sep. 11, 2014

(30) Foreign Application Priority Data

Mar. 11, 2013  (KR) .................. 10-2013-0025727

(51) Int. Cl.
  *G06F 12/10* (2016.01)
  *G06F 12/1009* (2016.01)
  *G06F 12/1027* (2016.01)

(52) U.S. Cl.
  CPC ...... *G06F 12/1009* (2013.01); *G06F 12/1027* (2013.01); *G06F 2212/654* (2013.01)

(58) Field of Classification Search
  None
  See application file for complete search history.

(56) References Cited

U.S. PATENT DOCUMENTS

| | | | |
|---|---|---|---|
| 5,796,971 A | 8/1998 | Emberson | |
| 7,584,394 B2 | 9/2009 | Choudhury et al. | |
| 7,793,067 B2 | 9/2010 | Kegel et al. | |
| 7,958,315 B2 | 6/2011 | Anand et al. | |
| 8,397,049 B2 | 3/2013 | Wang et al. | |
| 2004/0049640 A1* | 3/2004 | So ..................... | G06F 12/0862 711/137 |
| 2005/0198439 A1* | 9/2005 | Lange ................. | G06F 12/0862 711/137 |
| 2005/0228955 A1 | 10/2005 | Day, III et al. | |

(Continued)

FOREIGN PATENT DOCUMENTS

| | | |
|---|---|---|
| CN | 1389790 | 1/2003 |
| KR | 1020040038548 | 5/2004 |

(Continued)

OTHER PUBLICATIONS

Taiwanese Office Action dated May 23, 2017 for Application No. 103107120.

(Continued)

*Primary Examiner* — Idriss N Alrobaye
*Assistant Examiner* — Dayton Lewis-Taylor
(74) *Attorney, Agent, or Firm* — F. Chau & Associates, LLC

(57) ABSTRACT

A system on chip (SoC) includes a central processing unit (CPU), an intellectual property (IP) block, and a memory management unit (MMU). The CPU is configured to set a prefetch direction corresponding to a working set of data. The IP block is configured to process the working set of data. The MMU is configured to prefetch a next page table entry from a page table based on the prefetch direction during address translation between a virtual address of the working set of data and a physical address.

4 Claims, 11 Drawing Sheets

(56) References Cited

U.S. PATENT DOCUMENTS

| | | |
|---|---|---|
| 2006/0136696 A1 | 6/2006 | Grayson |
| 2006/0168432 A1 | 7/2006 | Caprioli et al. |
| 2009/0198904 A1 | 8/2009 | Arimilli et al. |
| 2010/0161915 A1* | 6/2010 | Kim .................... G06F 12/0215 |
| | | 711/154 |
| 2011/0010521 A1* | 1/2011 | Wang .................. G06F 12/1027 |
| | | 711/207 |
| 2012/0198176 A1 | 8/2012 | Hooker et al. |
| 2014/0258641 A1* | 9/2014 | Hooker ............... G06F 12/0862 |
| | | 711/137 |

FOREIGN PATENT DOCUMENTS

| | | |
|---|---|---|
| KR | 1020060099808 | 9/2006 |
| KR | 1020090076265 | 7/2009 |
| KR | 1020100005539 | 1/2010 |
| TW | 200636572 | 10/2006 |
| TW | I295015 | 3/2008 |

OTHER PUBLICATIONS

Taiwanese Search Report dated May 23, 2017 for Application No. 103107120.
Taiwanese Office Action Dated Oct. 17, 2017 for Application No. 103107120.
Taiwanese Search Report Dated Oct. 17, 2017 for Application No. 103107120.

* cited by examiner

SYSTEM-ON-CHIP AND METHOD OF OPERATING THE SAME

CROSS-REFERENCE TO RELATED APPLICATIONS

This application claims priority under 35 U.S.C. §119(a) to Korean Patent Application No. 10-2013-0025727, filed on Mar. 11, 2013, the disclosure of which is hereby incorporated by reference in its entirety.

TECHNICAL FIELD

Exemplary embodiments of the present inventive concept relate to a system-on-chip (SoC) including a memory management unit (MMU), and more particularly, to an SoC including an MMU performing an operation on a plurality of working sets of data, and a method of operating the same.

DISCUSSION OF THE RELATED ART

A memory management unit (MMU) is a hardware component that processes a memory access request issued by an intellectual property (IP) block (e.g., a direct memory access unit represented by a central processing unit (CPU) or a graphics processing unit (GPU)).

An example in which a memory access request is issued is with respect to a rotation operation of a display device (e.g., switching between portrait mode and landscape mode), which includes re-accessing and reading a source image, and generating a destination image (e.g., a rotated image) based on the rotation. When the source image is re-accessed, virtual addresses for data access may not increase sequentially.

When re-accessing the source image, the MMU may search a translation lookaside buffer (TLB) first, and then perform a page table walk (PTW) in the event of a TLB miss. In this case, when the number of TLB misses increases due to virtual addresses that do not sequentially increase in a device, the performance of the device may be degraded as a result of a large miss penalty.

SUMMARY

According to an exemplary embodiment of the present inventive concept, a system-on-chip (SoC) includes a central processing unit (CPU) configured to set a prefetch direction, an intellectual property (IP) block configured to process at least one working set, and at least one memory management unit (MMU) configured to prefetch a next page table entry based on the prefetch direction during address translation between a virtual address of the working set and a physical address.

According to an exemplary embodiment of the present inventive concept, an MMU includes a translation lookaside buffer (TLB) configured to translate a virtual address of each of a plurality of working sets requested by an IP block into a physical address, a special function register (SFR) configured to store a predetermined prefetch direction for each working set, and a prefetch buffer configured to prefetch a next page table entry from a memory device based on the prefetch direction during a page table walk.

According to an exemplary embodiment of the present inventive concept, a method of operating an SoC including a CPU, at least one IP block, and an MMU, includes the CPU setting a prefetch direction and MMU allocation information, the IP block issuing a data access request to the MMU with respect to each of a plurality of working sets, the MMU fetching a next page table entry based on the prefetch direction during a page table walk for address translation responding to the request, and the MMU translating the virtual address of each working set into a physical address based on the page table entry and accessing data.

According to an exemplary embodiment of the present inventive concept, an SoC includes a CPU configured to set prefetch direction information and MMU allocation information, an IP block configured to process at least one working set, at least one MMU configured to store the prefetch direction information, to be allocated for the working set, and to translate a virtual address of the working set corresponding to a request of the IP block into a physical address, an address distributor configured to store the MMU allocation information and to allocate the MMU to perform the translation based on the MMU allocation information, and a memory device configured to include a page table including a plurality of page table entries and to store data and physical address information of the data.

The MMU may prefetch a next page table entry to be accessed next from the page table based on the prefetch direction information.

According to an exemplary embodiment of the present inventive concept, an SoC includes a central processing unit (CPU) configured to set a prefetch direction corresponding to a working set of data, an intellectual property (IP) block configured to process the working set of data, and a memory management unit (MMU) configured to prefetch a next page table entry from a page table based on the prefetch direction during address translation between a virtual address of the working set of data and a physical address.

According to an exemplary embodiment of the present inventive concept, a memory management unit (MMU) includes a translation lookaside buffer (TLB) configured to translate a virtual address of each of a plurality of working sets of data requested by an intellectual property (IP) block into a corresponding physical address, a special function register (SFR) configured to store a predetermined prefetch direction for each working set of data, and a prefetch buffer configured to prefetch a next page table entry from a page table in a memory device based on the prefetch direction during a page table walk (PTW).

According to an exemplary embodiment of the present inventive concept, a method of operating a system-on-chip (SoC) includes setting a prefetch direction and memory management unit (MMU) allocation information, by a central processing unit (CPU) of the SoC, issuing a data access request to an MMU of the SoC with respect to each of a plurality of working sets of data, by an intellectual property (IP) block of the SoC, fetching a next page table entry from a page table based on the prefetch direction during a page table walk (PTW) for address translation in response to the data access request, by the MMU, and translating a virtual address of each working set of data into a physical address based on the next page table entry and accessing data corresponding to the physical address, by the MMU.

According to an exemplary embodiment of the present inventive concept, a system-on-chip (SoC) includes a central processing unit (CPU) configured to set prefetch direction information and memory management unit (MMU) allocation information, an intellectual property (IP) block configured to process at least one working set of data, an MMU configured to store the prefetch direction information to be allocated for the at least one working set of data, and to translate a virtual address of the at least one working set of data corresponding to a request of the IP block into a physical address, an address distributor configured to store the MMU allocation information and to allocate the MMU to perform the translation of the virtual address based on the MMU allocation information, and a memory device configured to store data and physical address information of the data, wherein the memory device comprises a page table having a plurality of page table entries, wherein the MMU is further configured to prefetch a next page table entry to be accessed next from the page table based on the prefetch direction information.

According to an exemplary embodiment of the present inventive concept, a system-on-chip (SoC) includes a central processing unit (CPU) configured to set first prefetch direction information corresponding to a first working set of data, and second prefetch direction information corresponding to a second working set of data, an intellectual property (IP) block configured to issue a data access request corresponding to the first or second working set of data, a first memory management unit (MMU) configured to prefetch a first next page table entry from a page table based on the first prefetch direction information during address translation between a virtual address of the first working set of data and a physical address corresponding to the virtual address of the first working set of data, a second MMU configured to prefetch a second next page table entry from the page table based on the second prefetch direction information during address translation between a virtual address of the second working set of data and a physical address corresponding to the virtual address of the second working set of data, and an address distributor configured to allocate the first MMU to the first working set of data or allocate the second MMU to the second working set of data in response to the data access request issued by the IP block.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION OF THE EXEMPLARY EMBODIMENTS

Figure 1:
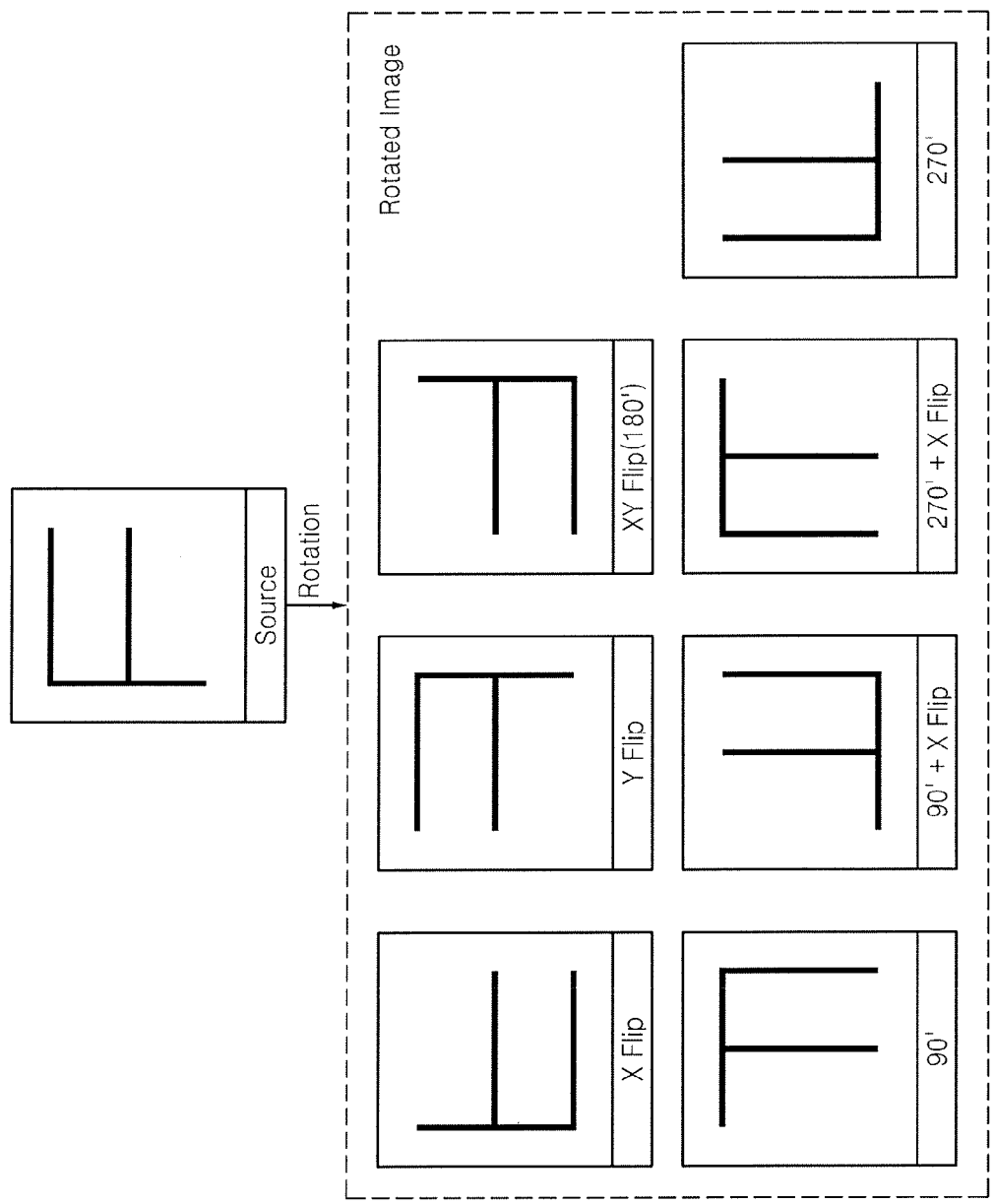
FIG. 1 illustrates a source image and rotated/destination images obtained by rotating the source image in predetermined directions, according to an exemplary embodiment of the present inventive concept.

Exemplary embodiments of the present inventive concept will be described more fully hereinafter with reference to the accompanying drawings. Like reference numerals may refer to like elements throughout the accompanying drawings.

It will be understood that when an element is referred to as being "connected" or "coupled" to another element, it can be directly connected or coupled to the other element or intervening elements may be present. As used herein, the term "and/or" includes any and all combinations of one or more of the associated listed items.

It will be further understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

FIG. 1 illustrates a source image and rotated images, also referred to as destination images, obtained by rotating the source image in predetermined directions, according to an exemplary embodiment of the present inventive concept. The source image may be rotated in various ways according to, for example, a setting of a display device, a user's setting, or a system setting. Herein, the terms rotated images and destination images may be used interchangeably.

As shown in FIG. 1, the source image may be rotated into a reverse position with respect to an X-axis (X flip), with respect to a Y-axis (Y flip), or with respect to an XY-axis (XY flip (180')). In addition, the source image may be rotated clockwise by 90 degrees (90'), may be rotated into the reverse position with respect to the X-axis and then rotated counter-clockwise by 90 degrees (90'+X flip) or 270 degrees (270'+X flip), or may be rotated clockwise by 270 degrees (270').

As described above, the rotated images are the destination images. An address access pattern for each rotation may be defined as described above.

Figure 2:
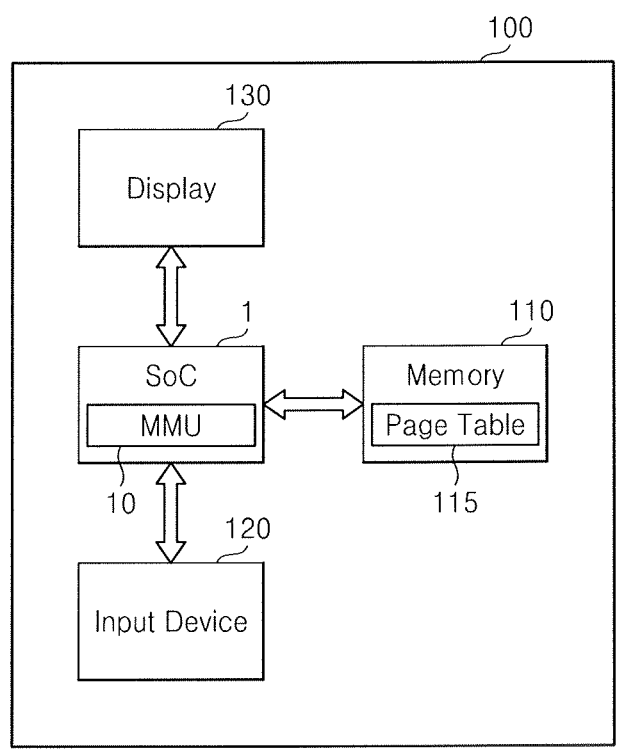
FIG. 2 is a block diagram of an electronic device including a memory management unit (MMU), according to an exemplary embodiment of the present inventive concept.

FIG. 2 is a block diagram of an electronic device 100 including a memory management unit (MMU) 10, according to an exemplary embodiment of the present inventive concept. The electronic system 100 may be, for example, a data processing device such as a smartphone, a personal computer (PC), a tablet PC, a netbook, an e-reader, a personal digital assistant (PDA), a portable multimedia player (PMP), an MP3 player, or an MP4 player. However, the electronic system 100 is not limited thereto. The electronic system 100 includes a system-on-chip (SoC) 1 which controls the overall operation of the electronic system 100.

The SoC 1 may be, for example, a processor capable of reading and executing program instructions. The SoC 1 may include the MMU 10. The SoC 1 executes program instructions, for example, program instructions generated by an input signal input through an input device 120. The SoC 1 reads data from a memory device 110 and displays the data through a display 130. The memory device 110 processes data according to a request received from the SoC 1.

The memory device 110 may include a page table 115 used to translate a virtual address into a physical address. Although FIG. 2 shows the memory device 110 located separately from the SoC 1, the location of the memory device 110 is not limited thereto. For example, in an exemplary embodiment, the memory device 110 may be disposed within the SoC 1. The input device 120 may be, for example, a keypad, a keyboard, or a pointing device such as a touch pad or a computer mouse.

Figure 3:
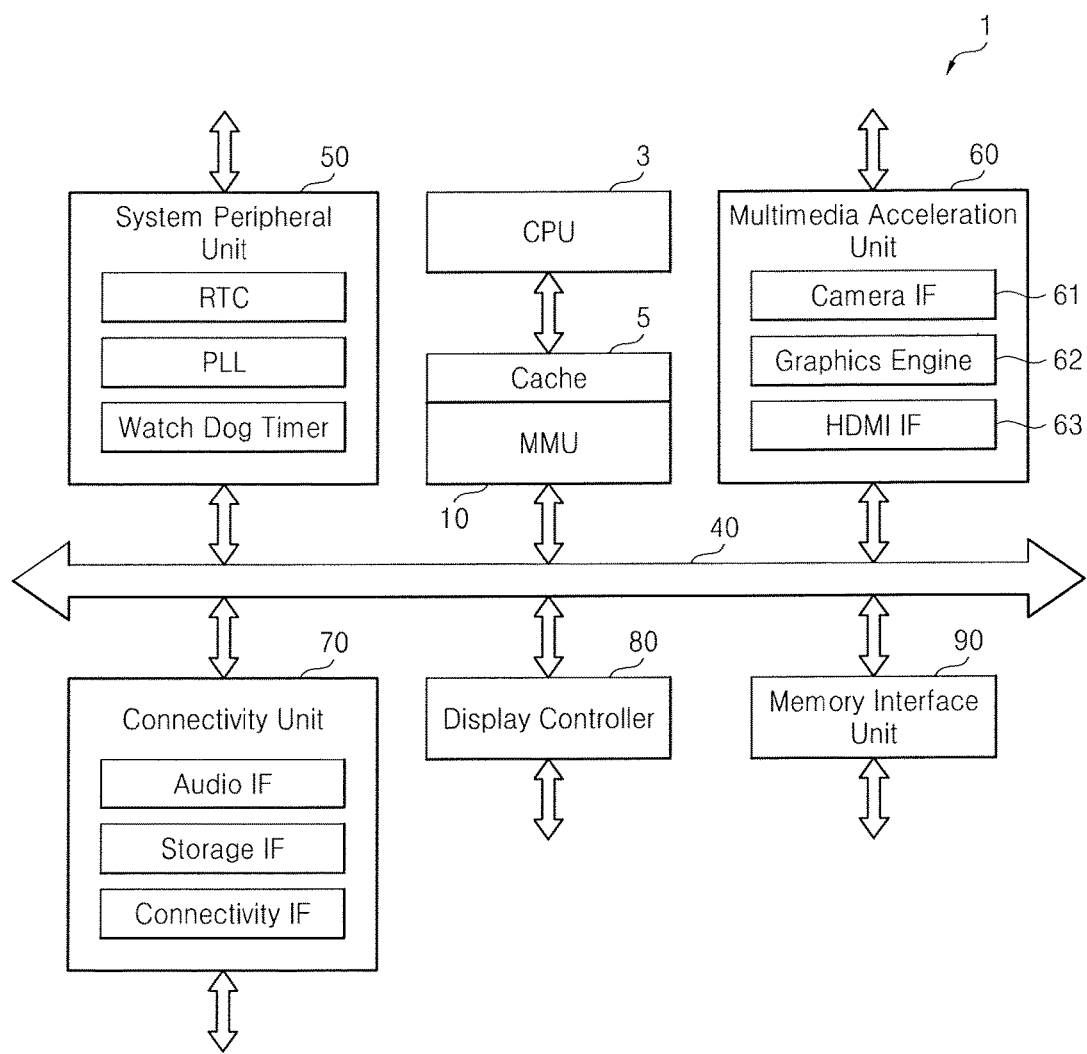
FIG. 3 is a block diagram of a system-on-chip (SoC) illustrated in FIG. 2, according to an exemplary embodiment of the present inventive concept.

FIG. 3 is a block diagram of the SoC 1 illustrated in FIG. 2, according to an exemplary embodiment of the present inventive concept. Referring to FIGS. 2 and 3, the SoC 1 may include a central processing unit (CPU) 3, a cache 5, and the MMU 10.

The CPU 3 may be a part of the SoC 1 that reads and executes program instructions. The MMU 10 may be used to translate a virtual address output from a display controller 80 into a physical address.

The cache 5 is a component which stores data so that the data may be quickly read from and/or written to the memory device 110. The CPU 3 may read the content of a page from the memory device 110 and store it in the cache 5. This may be referred to as performing a page-in process. The CPU 3 may also write the content of the page that has been stored in the cache 5 to the memory device 110. This may be referred to as performing a page-out process.

The MMU 10 is a hardware component that processes an access operation to the memory device 110 at the request of the CPU 3. The functions of the MMU 10 may include, for example, translating virtual addresses corresponding to requests from the CPU 3, a graphics processing unit (GPU), the display controller 80, or a graphics engine 62 included in a multimedia acceleration unit 60 into physical addresses, memory protection, controlling the cache 5, bus arbitration, and/or bank switching.

The SoC 1 may also include a system peripheral unit 50, the multimedia acceleration unit 60, a connectivity unit 70, the display controller 80, and a memory interface unit 90. The system peripheral unit 50, the multimedia acceleration unit 60, the connectivity unit 70, the display controller 80, and the memory interface unit 90 transmit and receive data or instructions through a system bus 40. The system bus 40 may include a plurality of channels. The channels may include, for example, a read data channel (R), a read address channel (AR), a write address channel (WR), a write response channel (B), and a write data channel (W) according to an AXI protocol.

The system peripheral unit 50 may include a real-time clock (RTC), a phase-locked loop (PLL), and a watch dog timer. The multimedia acceleration unit 60 may include the graphics engine 62. The multimedia acceleration unit 60 may further include a camera interface (IF) 61, the graphics engine 62, which may be integrated with a frame buffer or other video display circuitry for graphics computation, and a high-definition multimedia interface (HDMI) interface 63 which is an audio/video IF for transmission of uncompressed digital data. The MMU 10 may be used to translate virtual addresses of a working set output from the graphics engine 62 into physical addresses. In exemplary embodiments, the multimedia acceleration unit 60 may include an analog television encoding system such as, for example, a national television system committee (NTSC)/phase alternate line (PAL) system in place of or in addition to the HDMI interface 63.

The connectivity unit 70 may include an audio IF, a storage IF (e.g., an advanced technology attachment (ATA) IF), and a connectivity IF. The connectivity unit 70 communicates with the input device 120.

The display controller 80 controls data to be displayed on the display 130. The MMU 10 may be used to translate a virtual address output from the display controller 80 into a physical address.

The memory interface unit 90 enables the memory device 110 to be accessed according to the type of memory of the memory device 110 (e.g., a flash memory, dynamic random access memory (DRAM), etc.).

For convenience of explanation, processors such as the CPU 3, the graphics engine 62, and the display controller 80, that process data in units of working sets, may each be referred to herein as an intellectual property (IP) block. The IP blocks may operate on each working set and may process a plurality of working sets at a time. A working set is a data set stored in the memory device 110. The working set indicates a set of pages frequently referred to in the memory device 110 by the IP block, or the amount of pages that can be loaded from the IP block to the memory device 110. Each working set in the IP blocks may be managed independently from other working sets. A single working set may be, for example, data of consecutive virtual addresses.

Figure 4:
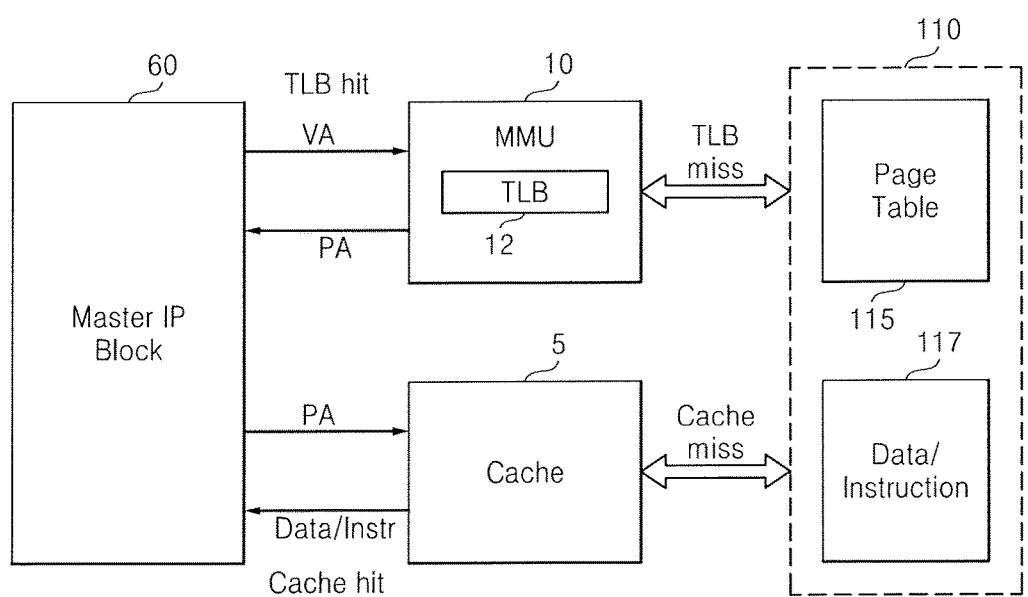
FIG. 4 is block diagram of the MMU illustrated in FIG. 2, according to an exemplary embodiment of the present inventive concept.

FIG. 4 is a block diagram of the MMU 10 illustrated in FIG. 2, according to an exemplary embodiment of the present inventive concept. Referring to FIGS. 2 through 4, the MMU 10 may include a translation lookaside table (TLB) 12, and may be connected with an IP block 60 and the memory device 110 through a plurality of channels (e.g., R, AR, AW, B, and W). Herein, the IP block 60 shown in FIG. 4 may be referred to as a master IP block 60.

The IP block 60 requests a data access operation to process a plurality of working sets. For the data access operation, the IP block 60 outputs a request corresponding to each of the working sets to the MMU 10 or the cache 5. At this time, the request output by the IP block 60 includes information regarding data to be accessed such as, for example, virtual addresses VA for a working set in the memory device 110.

The MMU 10 computes and outputs a physical page address PA using a virtual address VA at the request of the master IP block 60. The physical page address PA is a combination of a page number of the virtual address VA and an offset (e.g., a page table pointer) of the virtual address VA, and is an address used as an index to access a page table 115.

The TLB 12 is memory management hardware used to increase a virtual address translation speed. A page number and a frame number are mapped in the TLB 12. For example, the TLB 12 stores mapping information indicating the mapping between virtual addresses VA and physical addresses PA for pages referred to by the IP block 60. When translating a virtual address VA into a physical address PA, the MMU 10 first checks the TLB 12. When there is mapping information regarding the virtual address VA corresponding to a request of the IP block 60 in the TLB 12, the MMU 10 directly processes the translation without accessing the memory device 110 (referred to herein as a TLB hit).

When no mapping information regarding the virtual address VA corresponding to the request of the IP block 60 is present in the TLB 12 (referred to herein as a TLB miss), a page table walk (PTW) is performed. The PTW is a process of accessing the page table 115 and determining whether a page number and a frame number of the virtual address VA exist in the page table 115 in the case of a TLB miss, that is, when no information of a physical address PA mapped to the virtual address VA is present in the TLB 12. The page table 115 stores information regarding the mapping between virtual addresses VA and physical addresses PA for data in the memory device 110.

When the IP block 60 attempts to read an instruction or data using a physical address PA and the instruction or the data corresponding to the physical address PA is in the cache 5, the cache 5 directly outputs the instruction or the data to the IP block 60 (referred to herein as a cache hit) without the memory device 110 being accessed. When the instruction or the data does not exist in the cache 5, the cache 5 accesses a data/instruction storage block 117 to read the instruction or the data (referred to herein as a cache miss). The data/instruction storage block 117 stores information regarding each of the data/instructions in the memory device 110.

Figure 5:
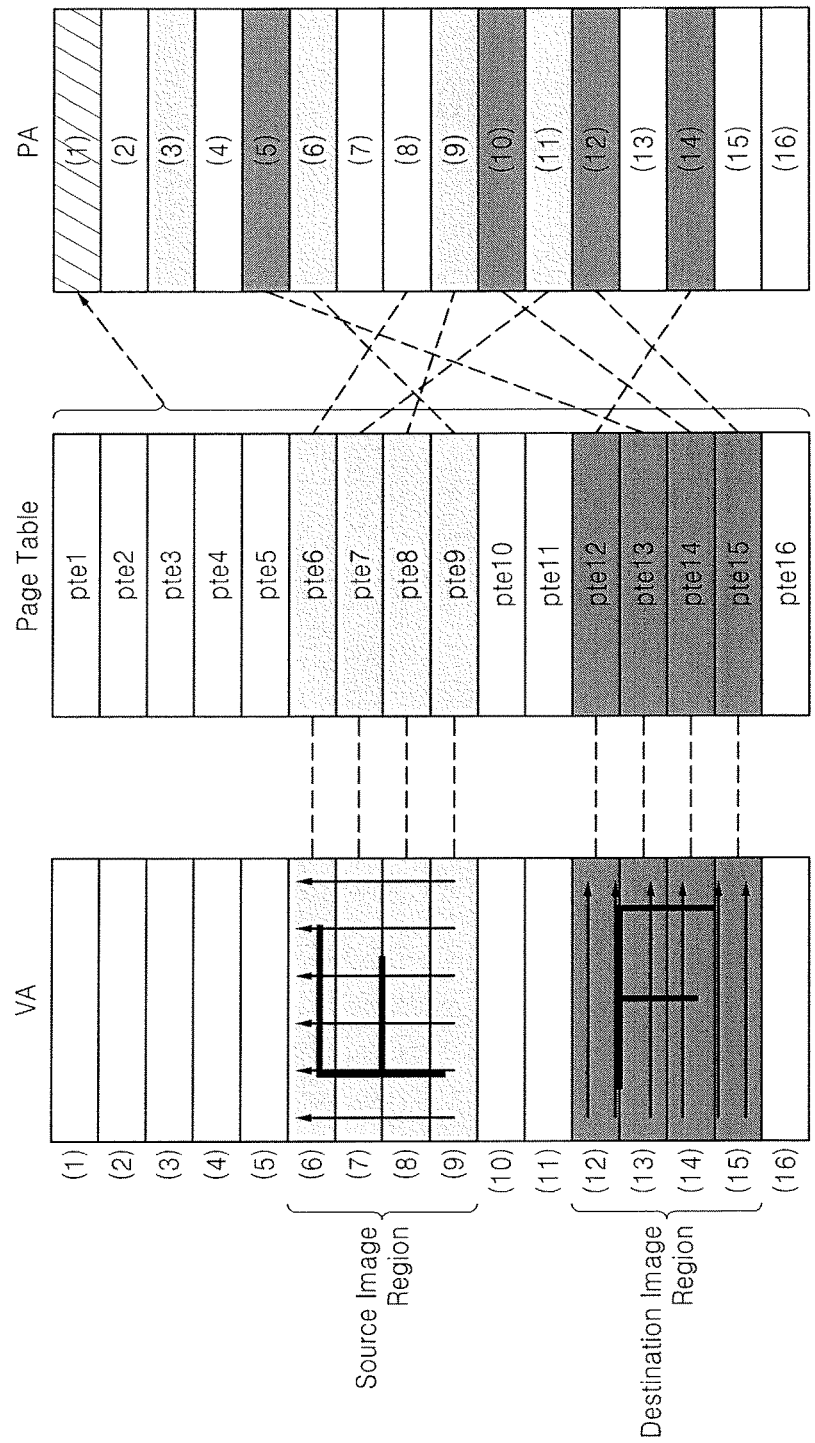
FIG. 5 is a diagram illustrating the mapping between virtual addresses and physical addresses based on a page table illustrated in FIG. 4, according to an exemplary embodiment of the present inventive concept.

FIG. 5 is a diagram illustrating the mapping between virtual addresses VA and physical addresses PA based on the page table 115 illustrated in FIG. 4, according to an exemplary embodiment of the present inventive concept. In the current example, it is assumed that the MMU 10 is performing the PTW after a TLB miss.

Referring to FIG. 5, an IP block issues a request to read a source image region corresponding to virtual addresses VA(6) through VA(9) with respect to a first working set for reading a source image. When physical address information corresponding to the virtual addresses VA(6) through VA(9) does not exist in the TLB 12 (e.g., in the case of a TLB miss), the MMU 10 accesses the page table 115 and performs the PTW.

The page table 115 includes physical address information, e.g., a plurality of page table entries, mapped to the virtual addresses VA of a page. The memory device 110 stores information regarding the page table 115 at a physical address PA(1).

The page table 115 indicates to the MMU 10 the physical address information corresponding to the virtual addresses VA(6) through VA(9) for the first working set through page table entries pte6 through pte9. The MMU 10 accesses physical addresses PA(8), PA(11), PA(9), and PA(6) according to the physical address information received from the page table 115, reads data stored at the physical addresses PA(8), PA(11), PA(9), and PA(6), and transmits the data to the IP block that has issued the source image region read request.

In the same manner used for the source image, the IP block issues a request to read a destination image region corresponding to virtual addresses VA(12) through VA(15) with respect to a second working set for reading a destination image. When physical address information corresponding to the virtual addresses VA(12) through VA(15) does not exist in the TLB 12 (e.g., in the case of a TLB miss), the MMU 10 accesses the page table 115 and performs the PTW.

The page table 115 indicates to the MMU 10 the physical address information corresponding to the virtual addresses VA(12) through VA(15) for the second working set through page table entries pte12 through pte15. The MMU 10 accesses physical addresses PA(14), PA(5), PA(10), and PA(12) according to the physical address information received from the page table 115, reads data stored at the physical addresses PA(14), PA(5), PA(10), and PA(12), and transmits the data to the IP block that has issued the destination image region read request.

Figure 6:
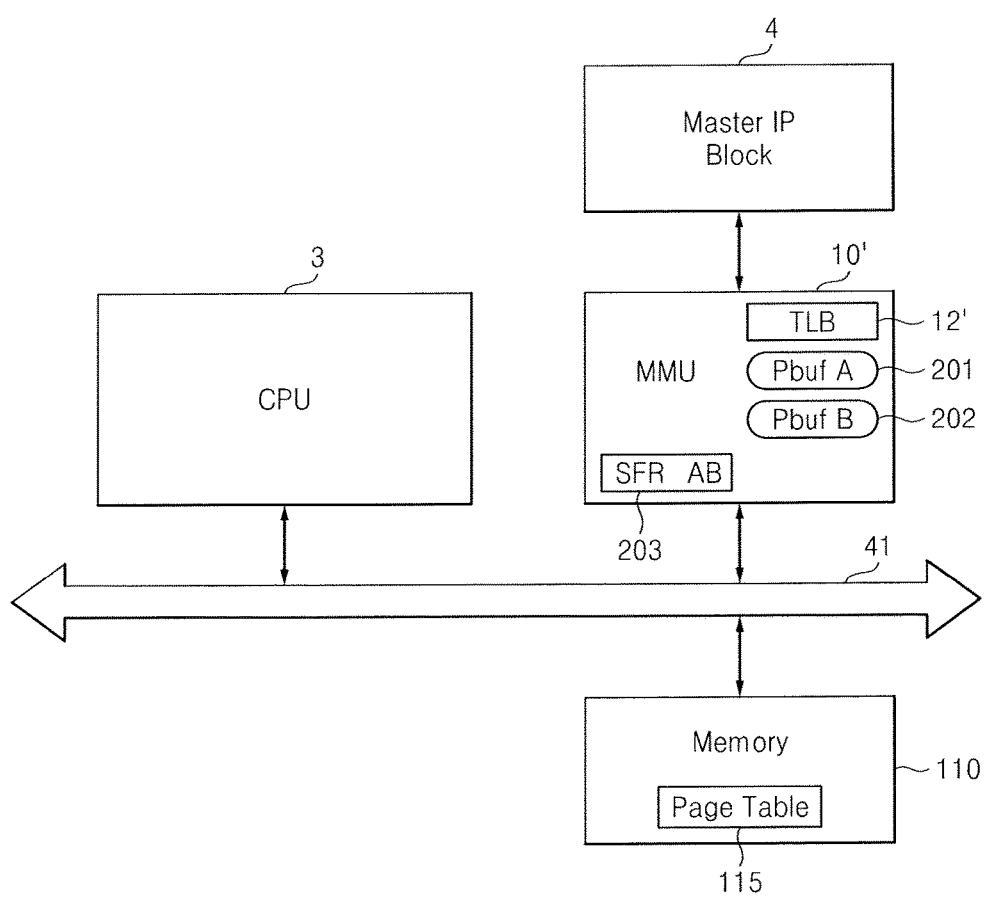
FIG. 6 is a diagram of the MMU illustrated in FIG. 2, according to an exemplary embodiment of the present inventive concept.

FIG. 6 is a diagram of an MMU 10', according to an exemplary embodiment of the present inventive concept. For convenience of explanation, only the CPU 3, the IP block 4, a bus 41, and the memory device 110 are illustrated.

However, it is to be understood that additional elements such as, for example, some of the elements shown in FIG. 3, may also be included. The IP block 4 may be referred to herein as a master IP block 4.

The IP block 4 operates in units of working sets, and performs an operation on a plurality of working sets. The working sets may be independent from each other in the memory device 110 and the IP block 4 may operate each of the working sets independently. The IP block 4 may be, for example, a GPU, the graphics engine 62, or any processing unit capable of direct memory access. The IP block 4 outputs a data access request to the MMU 10' when processing each working set.

An example in which the IP block 4 reads data from the memory device 110 will be described herein with reference to FIG. 6. Here, the IP block 4 processes a working set A and a working set B. It is assumed in the current example that the working set A corresponds to rotating a source image by 90 degrees, and the working set B corresponds to rotating the source image by 180 degrees, as shown in FIG. 1.

Before the IP block 4 issues the data access request, the CPU 3 writes the page table 115 to the memory device 110. The page table 115 includes a plurality of page table entries which map a virtual address to a physical address.

The CPU 3 sets prefetch direction information. In the exemplary embodiment illustrated in FIG. 6, the CPU 3 sets prefetch direction information A corresponding to the working set A and prefetch direction information B corresponding to the working set B in a special function register (SFR) 203. According to exemplary embodiments, prefetch direction information may be used to indicate a location at which a next page table entry in the page table 115 is located. Supplying the prefetch direction information to the MMU 10' (e.g., informing the MMU 10' of a prefetch direction) may improve the efficiency of the MMU 10' in regards to prefetching the next page table entry, which may result in increasing a prefetch hit ratio, thereby improving performance of the MMU 10'. For example, the prefetch direction may include information regarding a pattern in which a physical address is accessed according to the corresponding working set of data (see, for example, FIG. 5).

When the MMU 10' receives the data access request from the IP block 4, the MMU 10' identifies a working set based on a virtual address included in the data access request. The MMU 10' checks whether physical address information corresponding to the virtual address is present in the TLB 12' and performs the PTW in the case of a TLB miss.

The MMU 10' may include a prefetch buffer allocated for a working set. For example, in the exemplary embodiment shown in FIG. 6, the MMU 10' includes a prefetch buffer A 201 and a prefetch buffer B 202. The prefetch buffers 201 and 202 fetch or prefetch a page table entry that will be accessed by the MMU 10' and temporarily store the fetched/prefetched page table entry.

For the working set A, the MMU 10' fetches a page table entry from the page table 115 based on the prefetch direction information A set in the SFR 203, performs address translation for the working set A, and stores a page table entry to be subsequently accessed in the prefetch buffer A 201 based on the prefetch direction information A set in the SFR 203. After performing the address translation for the working set A based on the fetched page table entry, the MMU 10' performs address translation based on the prefetched page table entry. In the same manner as used for the working set A, referring to the working set B, the MMU 10' fetches and prefetches page table entries based on the prefetch direction information set B in the SFR 203 and performs address translation. The MMU 10' accesses physical addresses obtained through the address translation for the working sets A and B, and reads working set data A and working set data B from the memory device 110. Since an access direction is set in the SFR 203, the amount of time taken to find a prefetch direction after the fetch operation may be reduced. As a result, the performance and processing speed of the SoC 1 may be improved.

Although only the read operation has been described herein, exemplary embodiments of the inventive concept may also be applied to a write operation and an erase operation in a similar manner.

Figure 7:
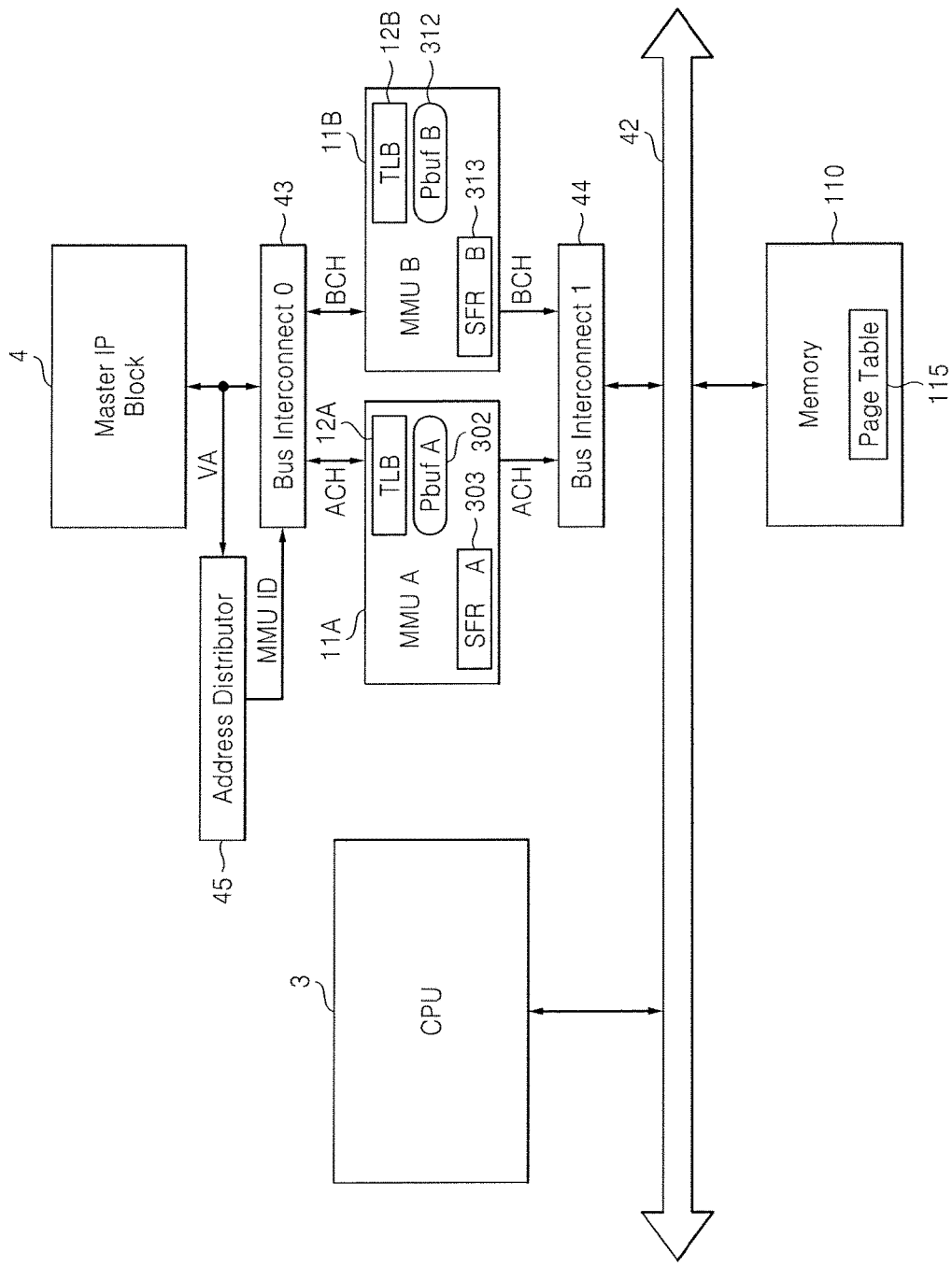
FIG. 7 is a diagram of the MMU illustrated in FIG. 2, according to an exemplary embodiment of the present inventive concept.

FIG. 7 is a diagram of the MMU 10 illustrated in FIG. 2, according to an exemplary embodiment of the present inventive concept. For convenience of explanation, only the CPU 3, a bus 42, the IP block 4, MMUs 11A and 11B, bus interconnects 43 and 44, and the memory device 110 are illustrated. However, it is to be understood that additional elements such as, for example, some of the elements shown in FIG. 3 and/or FIG. 6, may also be included. The IP block 4 may be referred to herein as a master IP block 4.

Referring to FIG. 7, the IP block 4 operates in units of working sets, and performs an operation on a plurality of working sets. The working sets may be independent from each other in the memory device 110 and the IP block 4 may operate each of the working sets independently. The IP block 4 outputs a data access request for each of the working sets to the MMU 11A or the MMU 11B.

An example in which the IP block 4 reads data from the memory device 110 will be described herein with reference to FIG. 7. Here, the IP block 4 processes a working set A and a working set B. It is assumed in the current example that the working set A corresponds to rotating a source image by 90 degrees, and the working set B corresponds to rotating the source image by 180 degrees, as shown in FIG. 1.

Before the IP block 4 issues the data access request, the CPU 3 writes the page table 115 to the memory device 110. The page table 115 includes a plurality of page table entries respectively corresponding to physical addresses.

The CPU 3 sets prefetch direction information. In the exemplary embodiments illustrated in FIG. 7, the CPU 3 sets prefetch direction information A corresponding to the working set A in an SFR 303 and sets prefetch direction information B corresponding to the working set B in an SFR 313.

The CPU 3 allocates MMUs 11A and 11B for the working sets A and B, respectively. In the exemplary embodiment illustrated in FIG. 7, the CPU 3 sets address information for each of the working sets A and B so that the MMU 11A performs address translation for the working set A, and the MMU 11B performs address translation for the working set B. For example, the CPU 3 sets MMU allocation information for each working set in an address distributor 45. The address distributor may include indicator information indicating the start and end virtual addresses of a working set.

When the IP block 4 issues the data access request, the address distributor 45 sends identification (ID) information corresponding to the MMU 11A or 11B, which is allocated for a working set corresponding to a virtual address VA included in the request, to the first bus interconnect 43. The first bus interconnect 43 connects the MMU 11A or 11B corresponding to the ID to the IP block 4 and transmits the data access request to the MMU 11A or 11B. For example, when the IP block 4 issues the data access request for the working set A, the address distributor 45 transmits the ID of the MMU 11A allocated for the working set B to the first bus interconnect 43. The first bus interconnect 43 opens a channel A and transmits the data access request from the IP block 4 to the MMU 11A.

When the MMUs 11A and 11B receive the data access request from the IP block 4, the MMUs 11A and 11B determine whether physical address information corresponding to the virtual address VA is present in TLBs 12A and 12B, respectively, and perform the PTW in the case of a TLB miss.

In the exemplary embodiment illustrated in FIG. 7, only one prefetch direction is set by the CPU 3 in each of the SFRs 303 and 313. For example, the SFR 303 stores only prefetch direction information A without storing the prefetch direction information B, and the SFR 313 stores only prefetch direction information B without storing the prefetch direction information A. Similarly, prefetch buffers 302 and 312 each store only a next page table entry that will subsequently be fetched with respect to the working set for which the MMU 11A or 11B, to which each prefetch buffer 302 or 312 belongs, is allocated.

For example, when a data access request for the working set A is issued, the MMU 11A fetches a page table entry from the page table 115 based on the prefetch direction information A set in the SFR 303, performs address translation for the working set A, and stores a page table entry to be subsequently accessed in the prefetch buffer 302. After performing the address translation for the working set A based on the fetched page table entry, the MMU 11A performs address translation based on the prefetched page table entry. Similarly, the MMU 11B fetches and prefetches page table entries based on the prefetch direction information B set in the SFR 313 and performs address translation.

The MMUs 11A and 11B access physical addresses obtained through the address translation for the working sets A and B, respectively, and read working set data A and working set data B, respectively, from the memory device 110.

Although only the read operation has been described herein, exemplary embodiments of the inventive concept may also be applied to a write operation and an erase operation in a similar manner.

Figure 8:
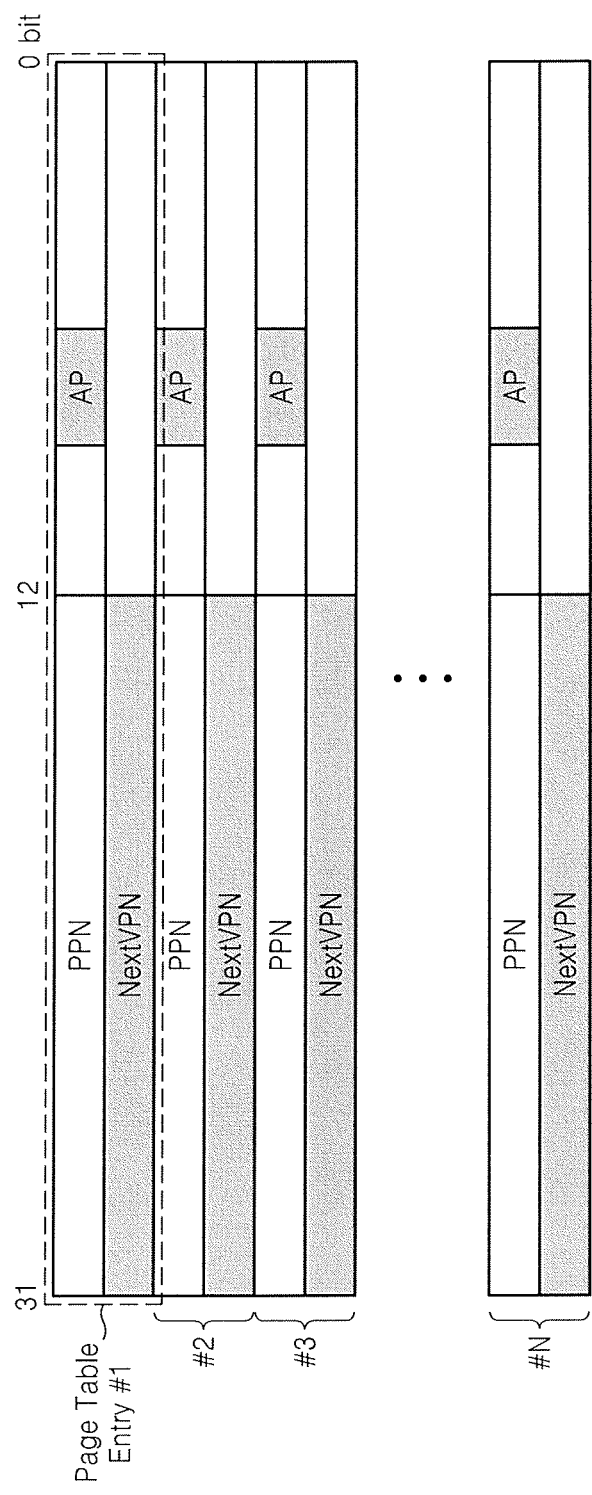
FIG. 8 is a diagram of the field structure of the page table illustrated in FIG. 4, according to an exemplary embodiment of the present inventive concept.

FIG. 8 is a diagram of the field structure of a page table, according to an exemplary embodiment of the present inventive concept. Referring to FIG. 8, the page table includes a plurality of page table entries #1 through #N, each of which may be comprised of, for example, 64 bits. However, exemplary embodiments are not limited thereto.

In each of the page table entries #1 through #N, first upper bits [31:12] represent a physical page number PPN corresponding to a virtual page address, lower bits [11:0] may indicate whether a page has recently been accessed, access rights, read/write availability, and whether the page has been loaded to a physical address, and second upper bits [31:12] represent page information NextVPN to be accessed next.

The second upper bits [31:12] may form a prefetch direction field. For example, when the MMU 10 fetches a page table entry during the PTW, the location at which the next prefetch operation should be performed can be detected based on the second upper bits [31:12], e.g., the prefetch direction field included in the fetched page table entry.

Alternatively, the second upper bits [31:12] may form a prefetch target entry number field. For example, when the MMU 10 fetches a page table entry during the PTW, the next page table entry can be accessed based on the second upper bits [31:12], e.g., the prefetch target entry number field included in the fetched page table entry.

The prefetch direction field or the prefetch target entry number field may be written by the CPU 3 to the page table 115.

Figure 9:
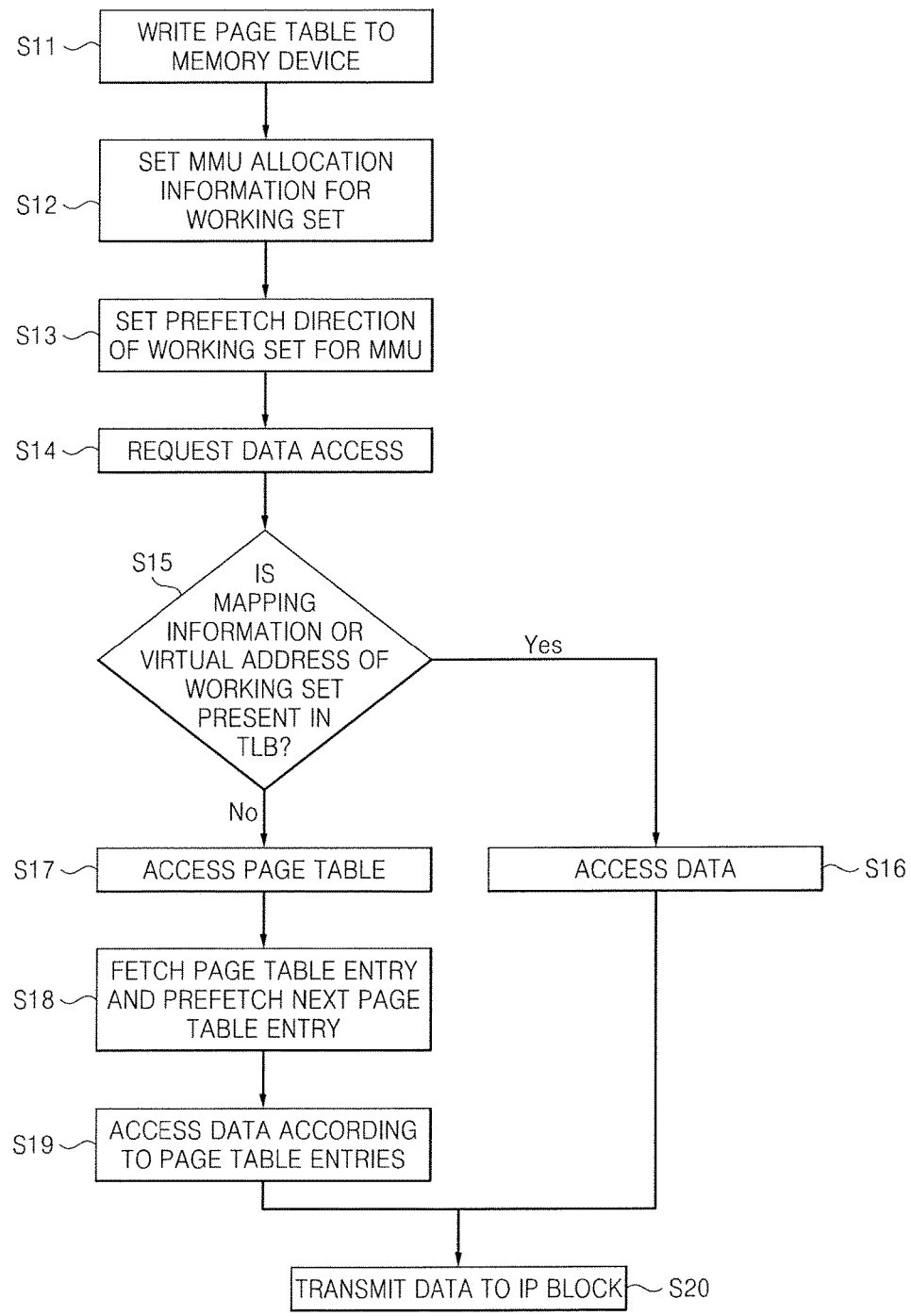
FIG. 9 is a flowchart of a method of operating an MMU, according to exemplary embodiments of the present inventive concept.

FIG. 9 is a flowchart of a method of operating an MMU, according to exemplary embodiments of the present inventive concept. Referring to FIG. 9, the CPU 3, which may be referred to herein as the main processor 3, writes a page table to the memory device 110 at operation S11. For example, as shown in FIG. 5, the main processor 3 controls page table information to be written to the physical address PA(1).

The main processor 3 sets MMU allocation information at operation S12. For example, when the IP block 4 operates for at least one working set, information regarding allocation of an MMU 10 from among at least one MMU 10 for address translation for a working set is set. For example, as shown in FIG. 7, when the IP block 4 operates on two working sets, the main processor 3 sets MMU allocation information in the address distributor 45 so that an MMU 10 is allocated for address translation based on a virtual address of each working set. The address distributor 45 may include an address register. In this case, the main processor 3 may set MMU mapping information in the address register with respect to the virtual address of the working set.

The main processor 3 sets a prefetch direction for each MMU 10 at operation S13. For example, when the MMU 10 is allocated for a working set of 90 degree rotation, the main processor 3 sets a prefetch direction in the MMU 10 which is used to predict a virtual address of data to be accessed next to read a source image rotated by 90 degrees. The prefetch direction may be set in an SFR, may be defined as a prefetch direction field in a page table entry in the page table 115, or may be defined as a prefetch target entry number field in the page table entry, as described above.

When only one MMU 10 is present, the main processor 3 may set and store as many prefetch directions as the number of working sets in one SFR included in the MMU 10. When a plurality of MMUs 10 are present, the main processor 3 may set and store a prefetch direction of a working set in an SFR included in each of the MMUs 10.

When the IP block 4 operates on at least one working set, data corresponding to the working set is requested to be accessed through the MMU 10 at operation S14. For example, the IP block 4 transmits a read command and a virtual address of the data to be read to the MMU 10.

The MMU 10 performs address translation with respect to the working set at the access request of the IP block 4 at operation S15. For example, the MMU 10 determines whether mapping information is present for the virtual address of the working set in the TLB 12. When mapping information is present in the TLB 12, the MMU 10 accesses a physical address corresponding to the virtual address in the memory device 110 and reads the data at operation S16. When no mapping information is present in the TLB 12, the MMU 10 accesses the page table 115 and performs a PTW at operation S17.

The MMU 10 accesses the page table 115, fetches a page table entry (e.g., a current page table entry), prefetches a next page table entry according to the prefetch direction, and stores the next page table entry in a prefetch buffer at operation S18. The MMU 10 translates the virtual address of the working set into a physical address based on the fetched page table entry and the prefetched next page table entry, and accesses data at the physical address at operation S19. The MMU 10 transmits the data to the IP block 4 at operation S20.

Figure 10:
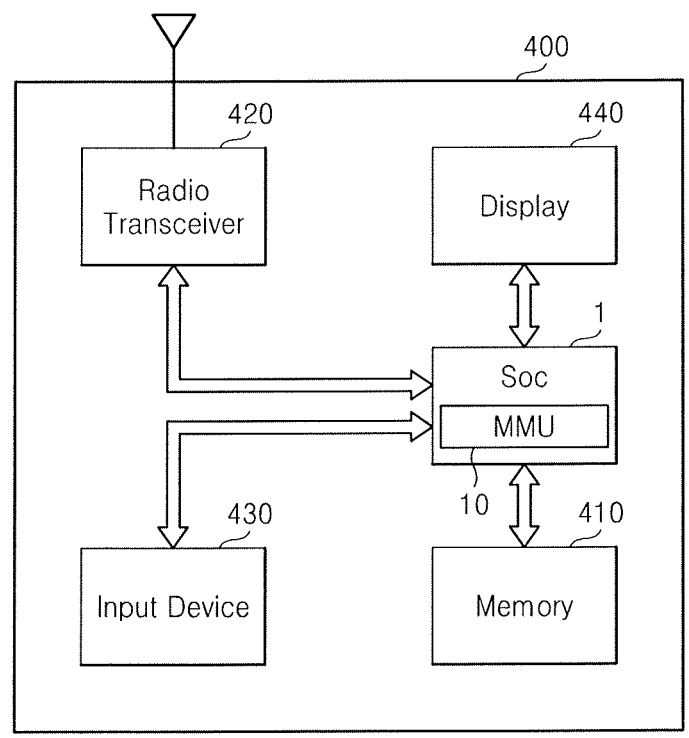
FIG. 10 is an electronic device including the SoC illustrated in FIG. 2, according to an exemplary embodiment of the present inventive concept.

FIG. 10 illustrates an electronic device 400 including the SoC 1 illustrated in FIG. 2, according to an exemplary embodiment of the present inventive concept. Referring to FIG. 10, the electronic device 400 may be, for example, cellular phone, a smartphone, a tablet PC, a PDA, a PMP, or a radio communication system, however, the electronic device 400 is not limited thereto.

The electronic device 400 includes a memory device 410 that stores data. The memory device 410 may include, for example, a non-volatile memory and a memory controller. The memory controller may control the data access operation (e.g., the program operation, the erase operation, or the read operation) of the non-volatile memory according to the control of the SoC 1.

A radio transceiver 420 transmits or receives radio signals through an antenna. For example, the radio transceiver 420 may convert radio signals received through the antenna into signals that can be processed by the SoC 1. Accordingly, the SoC 1 may process the signals output from the radio transceiver 420 and transmit the processed signals to the memory device 410 or to a display 440. The memory controller may program or write the signals processed by the SoC 1 to the non-volatile memory. The radio transceiver 420 may also convert signals output from the SoC 1 into radio signals and output the radio signals to an external device through the antenna.

An input device 430 enables control signals for controlling the operation of the SoC 1, or data to be processed by the SoC 1, to be input to the electronic device 400. The input device 430 may be, for example, a keypad, a keyboard, or a pointing device such as a touch pad or a computer mouse, however, the input device 430 is not limited thereto.

The SoC 1 may control the operation of the display 440 to display data output from the memory device 410, data output from the radio transceiver 420, or data output from the input device 430.

In exemplary embodiments, the memory controller controlling the operation of the non-volatile memory may be implemented as a part of the SoC 1 or in a chip that is separate from the SoC 1.

Figure 11:
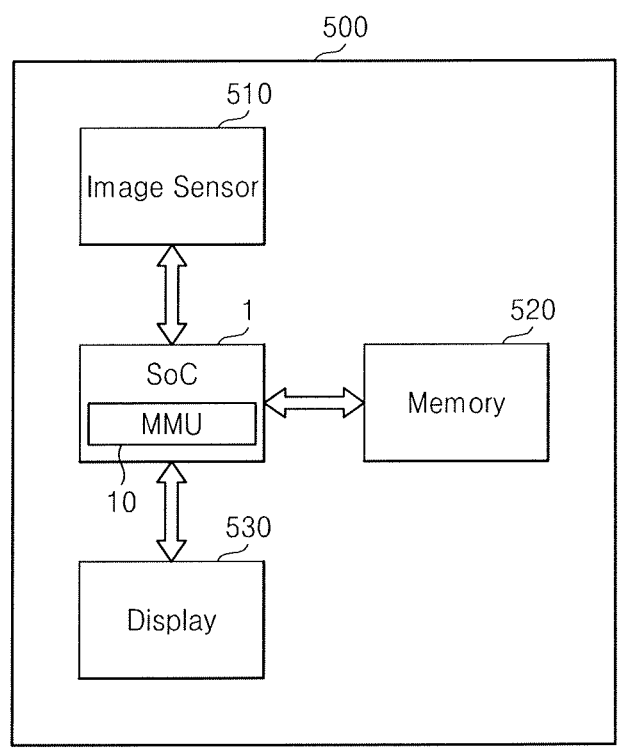
FIG. 11 is an electronic device 500 including the SoC 1 illustrated in FIG. 2, according to an exemplary embodiment of the present inventive concept.

FIG. 11 is an electronic device 500 including the SoC 1 illustrated in FIG. 2, according to an exemplary embodiment of the present inventive concept. Referring to FIG. 11, the electronic device 500 may be, for example, an image processing device such as a digital camera, a cellular phone equipped with a digital camera, a smartphone equipped with a digital camera, or a tablet PC equipped with a digital camera, however, the image processing device is not limited thereto.

The electronic device 500 includes a memory device 520. The memory device may include a non-volatile memory and a memory controller controlling the data processing operations (e.g., a program operation, an erase operation, and a read operation) of the non-volatile memory. An image sensor 510 included in the electronic device 500 converts optical images into digital signals and outputs the digital signals to the SoC 1 or the memory device 520. The digital signals may be controlled by the SoC 1 to be displayed through a display 530 or stored in the memory device 520.

Data stored in the memory device 520 may be displayed through the display 530 according to the control of the SoC 1 or the memory controller. The memory controller, which may control the operations of the non-volatile memory, may be implemented as a part of the SoC 1 or as a separate chip.

As described above, according to exemplary embodiments of the present inventive concept, an MMU is informed of a prefetch direction and prefetches a page table entry according to the prefetch direction. As a result, a prefetch hit ratio may be increased, and the performance of the MMU may be increased.

While the inventive concept has been particularly shown and described with reference to exemplary embodiments thereof, it will be understood by those of ordinary skill in the art that various changes in form and detail may be made therein without departing from the spirit and scope of the present inventive concept as defined by the following claims.

What is claimed is:

1. A system-on-chip (SoC), comprising:
a central processing unit (CPU) configured to set prefetch direction information and memory management unit (MMU) allocation information;
an intellectual property (IP) block configured to process at least one working set of data;
an MMU configured to store the prefetch direction information to be allocated for the at least one working set of data, and to translate a virtual address of the at least one working set of data corresponding to a request of the IP block into a physical address;
an address distributor configured to store the MMU allocation information and to allocate the MMU to perform the translation of the virtual address based on the MMU allocation information;
a memory device configured to store data and physical address information of the data, wherein the memory device comprises a page table having a plurality of page table entries,
wherein the MMU is further configured to prefetch a next page table entry to be accessed next from the page table based on the prefetch direction information,
wherein the at least one working set of data indicates a set of pages frequently referred to in the memory device by the IP block, or an amount of pages to be loaded from the IP block to the memory device; and
a bus interconnect configured to connect the MMU to the IP block based on identification (ID) information corresponding to the MMU,
wherein the ID information corresponding to the MMU is output to the MMU by the address distributor, and corresponds to the virtual address of the working set of data corresponding to the request based on the MMU allocation information.

2. The SoC of claim 1, wherein the MMU comprises:
a translation lookaside buffer (TLB) configured to store mapping information between the virtual address and the physical address;
a special function register configured to store the prefetch direction information; and
a prefetch buffer configured to prefetch the next page table entry from the page table based on the prefetch direction information, and store the next page table entry.

3. The SoC of claim 1, wherein each of the plurality of page table entries comprises a physical page address, an offset, and a prefetch direction field storing the prefetch direction, and the MMU is configured to prefetch the next page table entry based on the prefetch direction field.

4. The SoC of claim 1, wherein each of the plurality of page table entries comprises a physical page number, an offset, and a prefetch target entry number field, and the MMU is configured to prefetch the next page table entry corresponding to the prefetch target entry number field.

* * * * *